US011503596B2

(12) United States Patent
Zhang

(10) Patent No.: US 11,503,596 B2
(45) Date of Patent: Nov. 15, 2022

(54) DATA TRANSMISSION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Zhi Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 163 days.

(21) Appl. No.: 16/637,150

(22) PCT Filed: Aug. 11, 2017

(86) PCT No.: PCT/CN2017/097013
§ 371 (c)(1),
(2) Date: Feb. 6, 2020

(87) PCT Pub. No.: WO2019/028808
PCT Pub. Date: Feb. 14, 2019

(65) Prior Publication Data
US 2020/0367243 A1    Nov. 19, 2020

(51) Int. Cl.
*H04W 72/04* (2009.01)
*H04W 24/10* (2009.01)

(52) U.S. Cl.
CPC ....... *H04W 72/0453* (2013.01); *H04W 24/10* (2013.01); *H04W 72/042* (2013.01)

(58) Field of Classification Search
CPC ............ H04W 72/0453; H04W 24/10; H04W 72/042; H04W 24/02; H04W 72/085;
(Continued)

(56) References Cited

U.S. PATENT DOCUMENTS 10,687,365 B2 *  6/2020  Wu ................... H04W 74/0833
10,880,032 B2 * 12/2020  Yi ........................ H04L 27/2607
(Continued)

FOREIGN PATENT DOCUMENTS

CN      102238243 A     11/2011
CN      104205979 A     12/2014
(Continued)

OTHER PUBLICATIONS

Extended European Search Report for EP Application 17920982.0 dated Jul. 9, 2020.
(Continued)

*Primary Examiner* — Brian T O Connor
(74) *Attorney, Agent, or Firm* — Young Basile Hanlon & MacFarlane, P.C.

(57) ABSTRACT

Disclosed in the present application are a data transmission method, a terminal device and a network device. The method includes: the terminal device determines a first bandwidth portion and a second bandwidth portion; the terminal device uses the first bandwidth portion for data transmission and radio resource management (RRM) measurement on a specific time domain resource, and uses the second bandwidth portion for the data transmission on other time domain resources other than the specific time domain resource.

20 Claims, 9 Drawing Sheets

(58) Field of Classification Search
CPC .............. H04W 72/02; H04W 72/0446; H04L 5/0048; H04L 5/0057
See application file for complete search history.

(56) References Cited

U.S. PATENT DOCUMENTS

| | | | | |
|---|---|---|---|---|
| 10,924,982 | B2* | 2/2021 | Kim | .................... H04W 72/042 |
| 11,115,868 | B2* | 9/2021 | Kim | ...................... H04L 5/0091 |
| 11,166,306 | B2* | 11/2021 | Zhu | ....................... H04L 5/0092 |
| 11,258,571 | B2* | 2/2022 | Li | .......................... H04L 5/0092 |
| 11,310,820 | B2* | 4/2022 | Zhu | ....................... H04L 5/0098 |
| 2011/0105048 | A1 | 5/2011 | Nakao et al. | |
| 2015/0009845 | A1 | 1/2015 | Takano | |
| 2018/0279289 | A1* | 9/2018 | Islam | ................ H04W 72/0446 |
| 2019/0103931 | A1* | 4/2019 | Yi | ......................... H04J 11/0076 |
| 2020/0163113 | A1* | 5/2020 | Zhu | ....................... H04L 5/0005 |
| 2020/0344761 | A1* | 10/2020 | Amuru | .................. H04L 5/0044 |
| 2021/0037505 | A1* | 2/2021 | Kim | ...................... H04L 1/0002 |
| 2022/0070856 | A1* | 3/2022 | Lin | ........................ H04L 5/0051 |

FOREIGN PATENT DOCUMENTS

| | | |
|---|---|---|
| CN | 104509018 A | 4/2015 |
| RU | 2594892 C2 | 8/2016 |
| WO | 2013093437 A1 | 6/2013 |
| WO | 2013175182 A1 | 11/2013 |
| WO | 2014049325 A1 | 4/2014 |

OTHER PUBLICATIONS

3GPP TSG RAN WG1 NR Ad-Hoc Meeting #2; Qingdao, P.R. China, Jun. 27-30, 2017; R1-1710374.
3GPP TSG RAN WG1 NR Ad-Hoc#2; Qingdao, P.R. China, Jun. 27-30, 2017; R1-17010796.
3GPP TSG-RAN WG2 NR Ad-hoc#2 Meeting; Qingdao, China, Jun. 27-29, 2017; R2-1706427.
Russia First Office Action with English Translation for RU Application 2020108083/07(013126) dated Oct. 16, 2020.
3GPP TSG RAN WG1#89; Hangzhou, P.R. China May 15-19, 2017; R1-1708237.
Chinese Second Office Action with English Translation for CN Application 202010073082.8 dated Jul. 27, 2021. (12 pages).
Korean Office Action with English Translation for KR Application 1020207003290 dated Jul. 27, 2021. (9 pages).
Invitation to Respond to Written Opinion for SG Application 11202000995T dated Jul. 26, 2021. (6 pages).
LG Electronics, 3GPP TSG RAN WG1 Meeting Ad-Hoc, R1-1710352, Jun. 27-29, 2017. (10 pages).
Chile Office Action with English Translation for CL Application 2020-000276 dated Apr. 15, 2021. (17 pages).
Chinese First Office Action with English Translation for CN Application 202010073082.8 dated Apr. 26, 2021. (19 pages).
Communication pursuant to Article 94(3) EPC for EP Application 17920982.0 dated Apr. 26, 2021. (6 pages).
Japanese Office Action with English Translation for JP Application 2020-506181 dated Jul. 6, 2021. (6 pages).
3GPP TSG-RAN WG4 NR AH Meeting #2; R4-1706547; Qingdao, China, Jun. 27-29, 2017.
3GPP TSG RAN WG1 NR Ad Hoc Meeting; R1-1709974; Qingdao, China, Jun. 27-30, 2017.
3GPP TSG RAN WG1 NR Ad Hoc Meeting; R1-1709972; Qingdao, China, Jun. 27-30, 2017.
Sanada Office Action for CA Application 3,072,138 dated Apr. 1, 2021. (11 pages).
India First Examination Report for IN Application 202017004976 dated Mar. 30, 2021. (6 pages).
Korean Office Action with English Translation for KR Application 1020207003290 dated Jan. 28, 2022. (13 pages).
Canadian Examination Report for CA Application 3072138 dated Jan. 6, 2022. (4 pages).
Japanese Office Action with English Translation for JP Application 2020506181 dated Feb. 4, 2022. (4 pages).
Summons to attend oral proceedings pursuant to Rule 115(1) EPC for EP Application 17920982.0 mailed Dec. 2, 2021 (8 pages).
Chile Office Action with English Translation for CL Application 2020000276 dated Oct. 7, 2021. (11 pages).
Chinese Decision of Rejection with English Translation for CN Application 2020100730828 dated Oct. 29, 2021. (8 pages).
Israel Office Action for IL Application 272506 dated Sep. 4, 2022. (3 pages).

* cited by examiner

DATA TRANSMISSION METHOD, TERMINAL DEVICE, AND NETWORK DEVICE

CROSS-REFERENCE TO RELATED APPLICATION(S)

This application is a 371 application of International Application No. PCT/CN2017/097013, filed on Aug. 11, 2017, the entire disclosure of which is hereby incorporated by reference.

TECHNICAL FIELD

Implementations of the present disclosure relate to the field of wireless communication, and more particularly, relate to a data transmission method, a terminal device, and a network device.

BACKGROUND

In a Long Term Evolution (LTE) system, frequency domain resources for transmitting data are allocated in the whole system bandwidth. However, in a 5G New Radio (NR) system, a transmission bandwidth of a terminal device may only occupy a part of the system bandwidth due to greatly increased system bandwidth. For example, a network device divides the system bandwidth into a plurality of transmission bands, each transmission band is called a Bandwidth Part (BWP), and the terminal device only needs to perform data transmission in its corresponding bandwidth part.

In the 5G system, when the terminal device performs a Radio Resource Management (RRM) measurement, signals from different cells, such as Synchronization Signal Blocks (SS Blocks), may be located in different frequency positions, so the terminal device needs to measure signals from different cells in different frequency positions. If the different frequency positions of SS Blocks from different cells differ greatly in the frequency domain, the terminal needs to adopt a large reception bandwidth to receive the SS Blocks of all cells simultaneously. In such case, BWP configured for data transmission by the network device to the terminal device may not meet requirements for the terminal device to perform the RRM measurement.

SUMMARY

Implementations of the present disclosure provide a data transmission method, a terminal device and a network device.

In a first aspect, there is provided a data transmission method. The data transmission method includes: a terminal device determines a first bandwidth part and a second bandwidth part; and the terminal device performs data transmission and a radio resource management (RRM) measurement on a specific time domain resource by using the first bandwidth part, and performs the data transmission on other time domain resources than the specific time domain resource by using the second bandwidth part.

In one possible implementation, determining, by the terminal device, the first bandwidth part and the second bandwidth part, includes: the terminal device receives first configuration information and second configuration information sent by a network device, wherein the first configuration information includes bandwidth information about the first bandwidth part, and the second configuration information includes bandwidth information about the second bandwidth part; and the terminal device determines the first bandwidth part according to the first configuration information and determines the second bandwidth part according to the second configuration information.

In one possible implementation, determining, by the terminal device, the first bandwidth part and the second bandwidth part, includes: the terminal device receives second configuration information and third configuration information sent by a network device, wherein the second configuration information includes bandwidth information about the second bandwidth part, and the third configuration information includes information about a frequency band occupied by at least one signal to be measured by the terminal device in the RRM measurement; the terminal device determines the second bandwidth part according to the second configuration information, and determines a third bandwidth part according to the third configuration information, the third bandwidth part includes the frequency band occupied by the at least one signal; and the terminal device determines the first bandwidth part according to the second bandwidth part and the third bandwidth part.

In one possible implementation, the first bandwidth part includes the second bandwidth part and the third bandwidth part, and the second bandwidth part at least partially overlaps with the third bandwidth part, or does not overlap with the third bandwidth part.

In one possible implementation, the first bandwidth part includes a whole system bandwidth.

In one possible implementation, the bandwidth information includes at least one of: a center frequency, a bandwidth size, and a subcarrier spacing.

In one possible implementation, the specific time domain resource includes a plurality of time domain resources distributed according to a time periodicity.

In one possible implementation, the time periodicity is a time periodicity for the terminal device to perform the RRM measurement.

In one possible implementation, the at least one signal to be measured by the terminal device in the RRM measurement includes a synchronization signal (SS) block and/or a channel state indication reference signal (CSI-RS) of at least one cell to be measured.

In a second aspect, there is provided a data transmission method. The data transmission method includes: a network device sends first configuration information or third configuration information to a terminal device, wherein the first configuration information includes bandwidth information about a first bandwidth part, the third configuration information includes information about a frequency band occupied by at least one signal to be sent for the terminal device to perform a radio resource management (RRM) measurement, and the first configuration information and the third configuration information are used for the terminal device to determine the first bandwidth part so that the terminal device performs data transmission and the RRM measurement on a specific time domain resource by using the first bandwidth part; the network device sends second configuration information to the terminal device, wherein the second configuration information includes bandwidth information about the second bandwidth part, so that the terminal device performs the data transmission on other time domain resources than the specific time domain resource by using the second bandwidth part.

In one possible implementation, if the network device sends the third configuration information to the terminal device, the method further includes: the network device determines a third bandwidth part according to the information about the frequency band occupied by the at least one signal to be sent for the terminal device to perform the RRM measurement, wherein the third bandwidth part includes the frequency band occupied by the at least one signal; and the network device determines the first bandwidth part according to the second bandwidth part and the third bandwidth part.

In one possible implementation, the first bandwidth part includes the second bandwidth part and the third bandwidth part, and the second bandwidth part at least partially overlaps with the third bandwidth part, or does not overlap with the third bandwidth part.

In one possible implementation, the first bandwidth part includes a whole system bandwidth.

In one possible implementation, the bandwidth information includes at least one of: a center frequency, a bandwidth size, and a subcarrier spacing.

In one possible implementation, the specific time domain resource includes a plurality of time domain resources distributed according to a time periodicity.

In one possible implementation, the time periodicity is a time periodicity for the terminal device to perform the RRM measurement.

In one possible implementation, the at least one signal to be sent for the terminal device to perform the RRM measurement includes a synchronization signal (SS) block and/or a channel state indication reference signal (CSI-RS) of at least one cell to be measured.

In a third aspect, there is provided a terminal device that may perform operations of the terminal device in the first aspect or any optional implementation of the first aspect. Specifically, the terminal device may include modules used for performing operations of the terminal device in the first aspect or any possible implementation of the first aspect.

In a fourth aspect, there is provided a network device that may perform operations of the network device in the second aspect or any optional implementation of the second aspect. Specifically, the network device may include modules used for performing operations of the network device in the second aspect or any possible implementation of the second aspect.

In a fifth aspect, there is provided a terminal device. The terminal device includes: a processor, a transceiver, and a memory. The processor, the transceiver, and the memory communicate with each other through an internal connection path. The memory is used for storing instructions, and the processor is used for executing the instructions stored in the memory. When the processor executes the instructions stored in the memory, the execution causes the terminal device to execute the method in the first aspect or any possible implementation of the first aspect, or the execution causes the terminal device to implement the terminal device provided in the third aspect.

In a sixth aspect, there is provided a network device. The network device includes: a processor, a transceiver, and a memory. The processor, the transceiver, and the memory communicate with each other through an internal connection path. The memory is used for storing instructions, and the processor is used for executing the instructions stored in the memory. When the processor executes the instructions stored in the memory, the execution causes the network device to execute the method in the second aspect or any possible implementation of the second aspect, or the execution causes the network device to implement the network device provided in the fourth aspect.

In a seventh aspect, there is provided a computer-readable storage medium storing a program that causes a terminal device to perform any data transmission method in the first aspect and various implementations thereof.

In an eighth aspect, there is provided a computer-readable storage medium storing a program that causes a network device to perform any data transmission method in the second aspect and various implementations thereof.

In a ninth aspect, there is provided a system chip, which includes an input interface, an output interface, a processor, and a memory, wherein the processor is used for executing instructions stored in the memory, and when the instructions are executed, the processor may implement the method in the first aspect or any possible implementation thereof.

In a tenth aspect, there is provided a system chip, which includes an input interface, an output interface, a processor, and a memory, wherein the processor is used for executing instructions stored in the memory, and when the instructions are executed, the processor may implement methods in the second aspect and any possible implementation thereof.

In an eleventh aspect, a computer program product containing instructions is provided. When the computer program product is run on a computer, the computer is caused to perform the method in the first aspect or any possible implementation thereof.

In a twelfth aspect, a computer program product containing instructions is provided. When the computer program product is run on a computer, the computer is caused to perform the method in the second aspect or any possible implementation thereof.

DETAILED DESCRIPTION

Hereinafter, technical solutions in the implementations of the present disclosure will be described with reference to the accompanying drawings.

It should be understood that the technical solutions of the implementations of the present disclosure may be applied to various communication systems, such as a Global System of Mobile Communication (GSM) system, a Code Division Multiple Access (CDMA) system, a Wideband Code Division Multiple Access (WCDMA) system, a Long Term Evolution (LTE) system, a LTE Frequency Division Duplex (FDD) system, a LTE Time Division Duplex (TDD) system, a Universal Mobile Telecommunication System (UMTS), and a future 5G communication system.

Various implementations are described herein in connection with terminal devices in the present disclosure. The terminal device may also refer to a User Equipment (UE), an access terminal, a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device or other processing device connected to a wireless modem, an on-board device, a wearable device, a terminal device in a future 5G network, or a terminal device in a future evolving Public Land Mobile Network (PLMN), etc.

Various implementations are described herein in connection with network devices in the present disclosure. A network device may be a device for communicating with a terminal device, such as a Base Transceiver Station (BTS) in a GSM system or CDMA, a NodeB (NB) in a WCDMA system, or an Evolutional Node B (eNB or eNodeB) in a LTE system, or the network device may be a relay station, an access point, a vehicle-mounted device, a wearable device, a network side device in a future 5G network, or a network side device in a future evolved PLMN network, etc.

Figure 1:
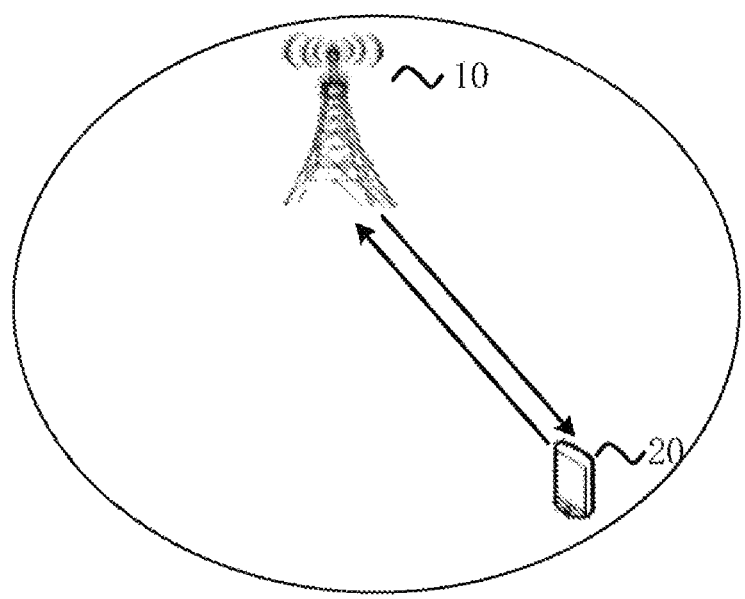
FIG. 1 is a schematic architecture diagram of an application scenario according to an implementation of the present disclosure.

FIG. 1 is a schematic diagram of an application scenario according to an implementation of the present disclosure. The communication system in FIG. 1 may include a network device 10 and a terminal device 20. The network device 10 is used for providing communication services for the terminal device 20 and is connected to a core network. The terminal device 20 may access the network by searching for a synchronization signal, or a broadcast signal, etc., sent by the network device 10, to communicate with the network. Arrows shown in FIG. 1 may represent uplink/downlink transmission through cellular links between the terminal device 20 and the network device 10.

The network in the implementation of the present disclosure may refer to a Public Land Mobile Network (PLMN) or a Device-to-Device (D2D) network or a Machine-to-Machine/man (M2M) network or other networks. FIG. 1 is a simplified schematic diagram of an example, and other terminal devices may be included in the network and are not shown in FIG. 1.

In a 5G New Radio (NR) system, the system bandwidth may reach hundreds of MHz or even several GHz. However, when the terminal device works, it does not always need such a large bandwidth. For example, when transmitting at a low data rate, the terminal device only needs to adopt a small working bandwidth. Therefore, a concept of Bandwidth Part (BWP) is proposed. After a network device configures a BWP to a terminal device, the terminal device only needs to send and receive data within the BWP, thus effectively reducing power consumption of the terminal device during low data rate transmission.

Figure 2:
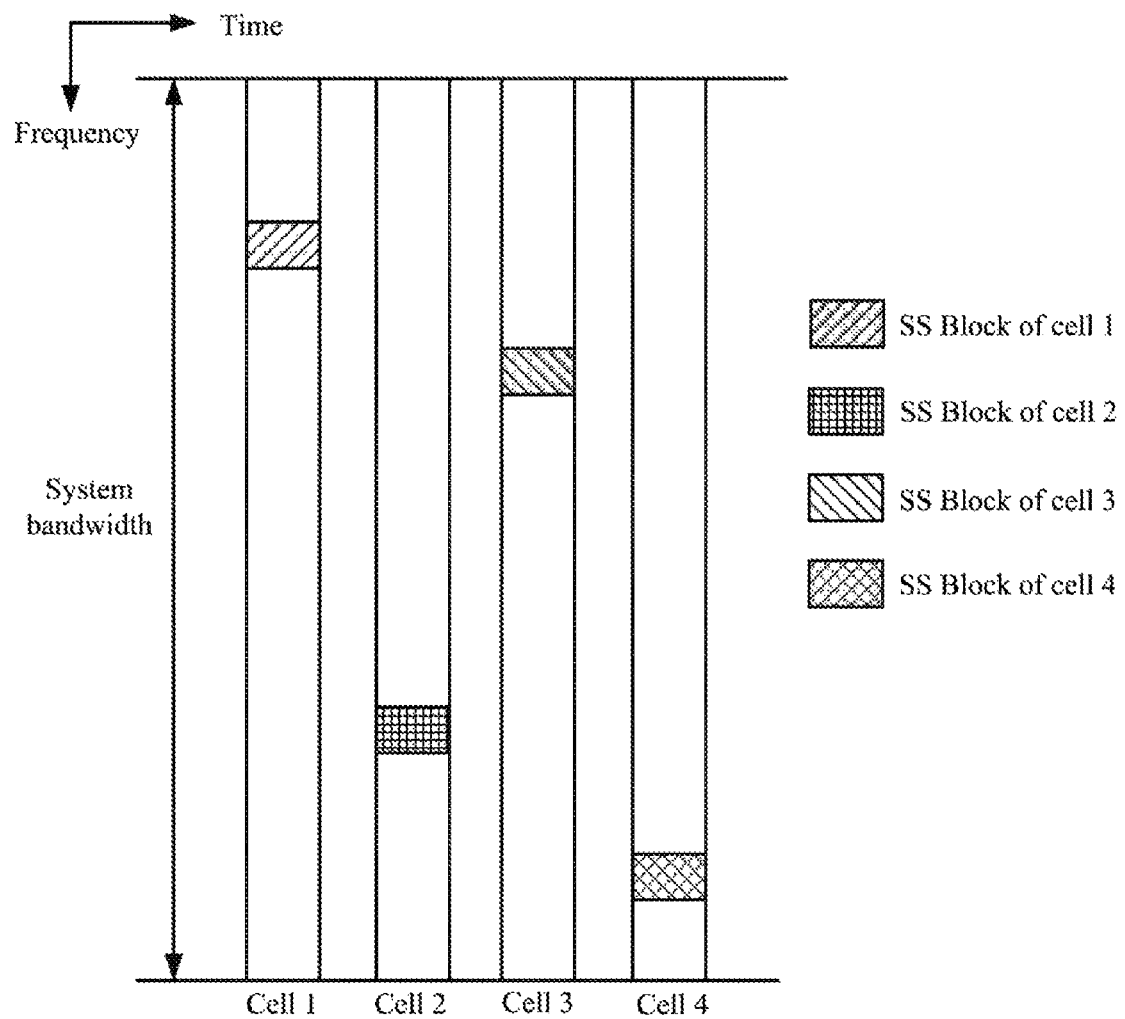
FIG. 2 is a schematic diagram of frequency domain positions of SS Blocks of different cells.

A synchronization channel in the 5G system is transmitted in a form of a Synchronization Signal (SS) Block, and each SS Block includes a Primary Synchronization Signal (PSS), a Secondary Synchronization Signal (SSS), a Physical Broadcast Channel (PBCH) signal, etc. In a LTE system, PSS, SSS and PBCH are always located in a central position of the system bandwidth. But in the 5G system, the position of the SS Block in the system bandwidth is not fixed, but is flexibly configured by the network device according to deployment requirements. It brings about a problem, for example, when a terminal device performs a Radio Resource Management (RRM) measurement, signals from different cells, such as the SS Blocks, may be located in different frequency positions, so the terminal device needs to measure signals from different cells in different frequency positions. If the different frequency positions of signals from different cells differ greatly in the frequency domain, for example, as shown in FIG. 2, SS Blocks of different cells (e.g., cell 1, cell 2, cell 3, and cell 4) are located in different frequency positions respectively, the terminal needs to adopt a large reception bandwidth to receive the SS Blocks of all cells simultaneously. In such case, BWP configured for data transmission by the network device to the terminal device may not meet requirements for the terminal device to perform the RRM measurement.

According to the implementation of the present disclosure, two different bandwidth parts are respectively configured for the terminal device based on different requirements for the terminal device to perform the data transmission and the RRM measurement, and the terminal device uses different bandwidth parts when performing different operations. Since the bandwidth part used for the data transmission and RRM measurement is different from the bandwidth part used for data transmission only, the terminal device can effectively perform data transmission in the corresponding bandwidth part and simultaneously meet the requirement of the RRM measurement.

Figure 3:
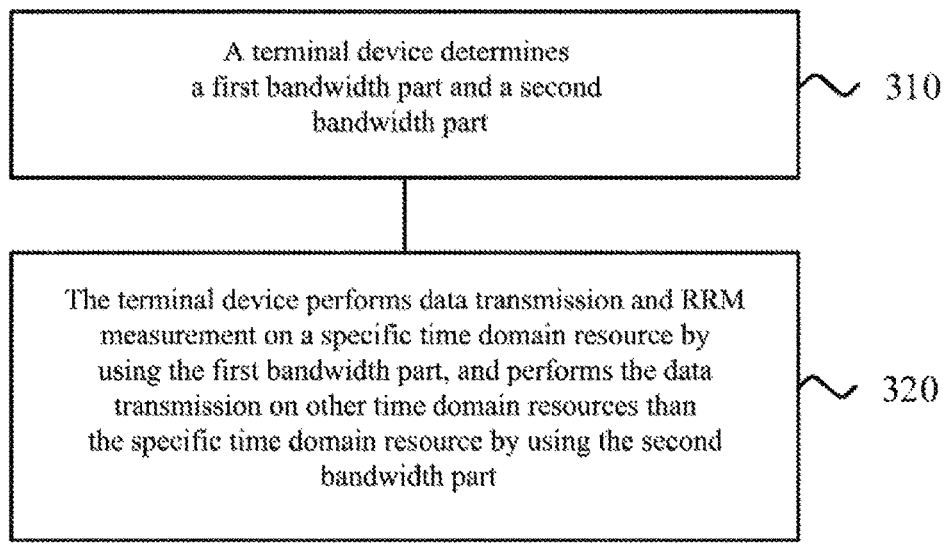
FIG. 3 is a schematic flowchart of a data transmission method according to an implementation of the present disclosure.

FIG. 3 is a schematic flowchart of a data transmission method according to an implementation of the present disclosure. The method shown in the FIG. 3 may be performed by a terminal device which may be, for example, the terminal device 20 shown in FIG. 1. As shown in FIG. 3, the data transmission method includes the following acts 310 and 320.

In 310, a terminal device determines a first bandwidth part and a second bandwidth part.

In 320, the terminal device performs data transmission and a radio resource management (RRM) measurement on a specific time domain resource by using the first bandwidth part, and performs the data transmission on other time domain resources than the specific time domain resource by using the second bandwidth part.

Specifically, the first bandwidth part (first BWP) and the second bandwidth part (second BWP) are both bandwidth parts for data transmission performed by the terminal device, and the first bandwidth part is further used for the terminal device to perform the RRM measurement, for example, measurement is performed on an SS block and/or a reference signal from a cell to be measured, and the reference signal may be, e.g., a channel state indication reference signal (CSI-RS). After determining the first bandwidth part and the second bandwidth part, the terminal device may perform the data transmission and the RRM measurement on the specific time domain resource by using the first bandwidth part, and perform the data transmission on other time domain resources than the specific time domain resource by using the second bandwidth part.

Optionally, the specific time domain resource includes a plurality of time domain resources distributed according to a time periodicity.

Further, optionally, the time periodicity is a time periodicity for the terminal device to perform the RRM measurement. That is, the terminal device may perform the RRM measurement according to the time periodicity.

Figure 4:
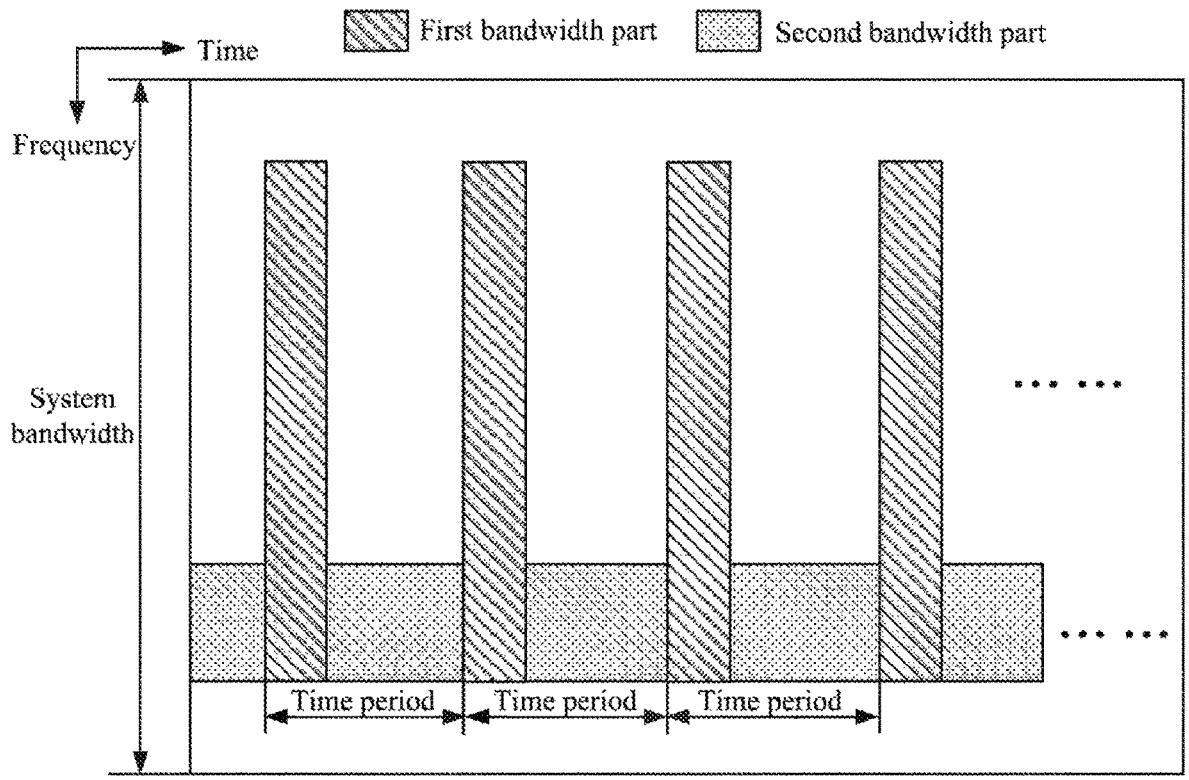
FIG. 4 is a schematic diagram of bandwidth parts according to an implementation of the present disclosure.

For example, as shown in FIG. 4, the terminal device performs the data transmission and the RRM measurement on the plurality of time domain resources distributed according to the time periodicity by using the first bandwidth part, and performs the data transmission on other time domain resources by using the second bandwidth part.

Therefore, the terminal device determines two different transmission bandwidths, and uses different bandwidth parts when performing different operations. Since the bandwidth part used for the data transmission and RRM measurement is different from the bandwidth part used for data transmission only, the terminal device can effectively perform data transmission in the corresponding bandwidth part and simultaneously meet the requirement of the RRM measurement.

It should be understood that in the implementation of the present disclosure, when the terminal device performs data transmission with the network device on the first bandwidth part and the second bandwidth part, the transmitted data may include service data, signaling data or other types of data, which are not limited here. The data transmission may include receiving by the terminal device the data sent by the network device or sending by the terminal device the data to the network device.

In 310, specifically the terminal device may determine the first bandwidth part and the second bandwidth part in the following two modes.

Mode 1

Figure 5:
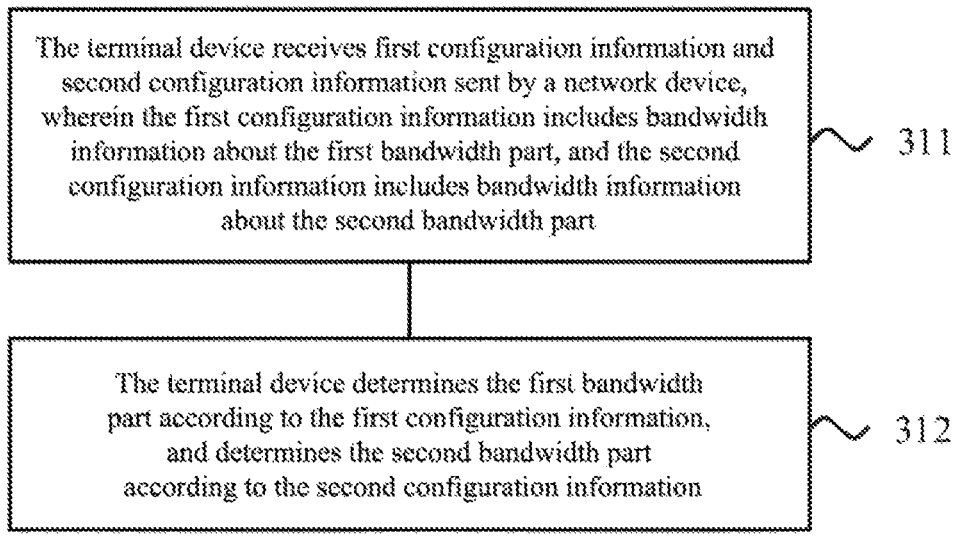
FIG. 5 is a schematic flowchart of an approach for determining a bandwidth part according to an implementation of the present disclosure.

Optionally, as shown in FIG. 5, act 310 may include acts 311 and 312.

In 311, the terminal device receives first configuration information and second configuration information sent by a network device.

Herein the first configuration information includes bandwidth information about the first bandwidth part, and the second configuration information includes bandwidth information about the second bandwidth part.

In 312, the terminal device determines the first bandwidth part according to the first configuration information, and determines the second bandwidth part according to the second configuration information.

Specifically, the first configuration information and the second configuration information are configured by the network device and indicated to the terminal device through the first configuration information and the second configuration information. The terminal device may determine the first bandwidth part according to the received first configuration information and determine the second bandwidth part according to the received second configuration information.

Mode 2

Figure 6:
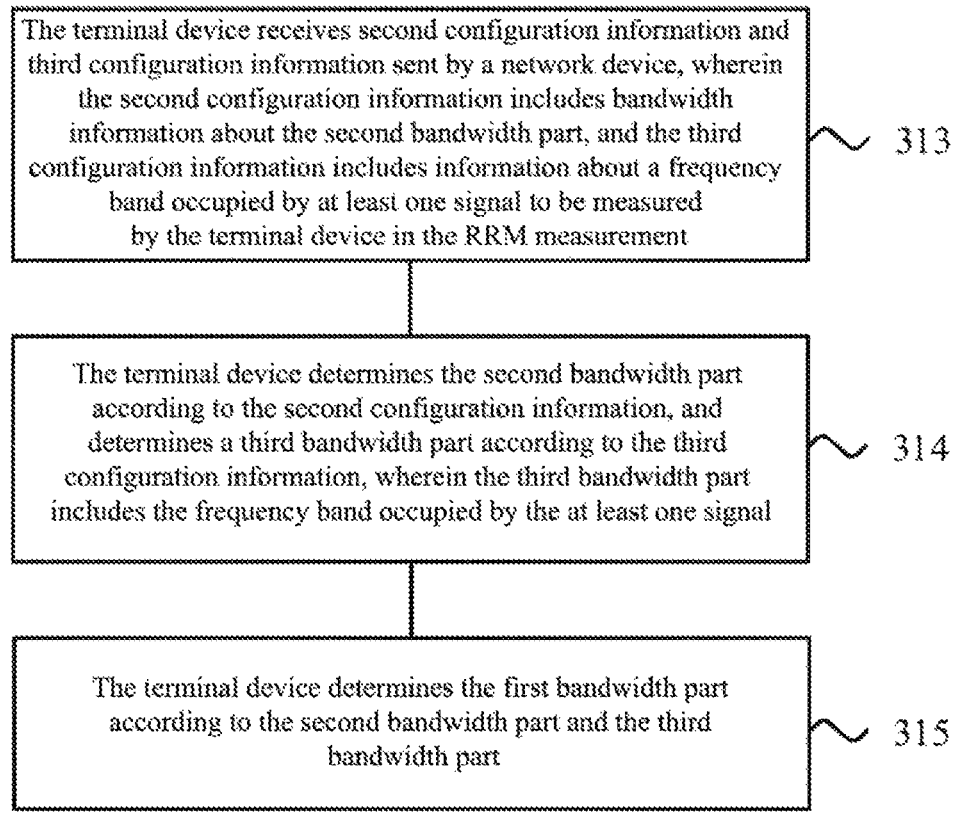
FIG. 6 is a schematic flowchart of an approach for determining a bandwidth part according to an implementation of the present disclosure.

Optionally, as shown in FIG. 6, act 310 may include acts 313 to 315.

In 313, the terminal device receives second configuration information and third configuration information sent by a network device.

Herein, the second configuration information includes bandwidth information about the second bandwidth part, and the third configuration information includes information about a frequency band occupied by at least one signal to be measured by the terminal device in the RRM measurement.

In 314, the terminal device determines the second bandwidth part according to the second configuration information, and determines a third bandwidth part according to the third configuration information, wherein the third bandwidth part includes the frequency band occupied by the at least one signal.

In 315, the terminal device determines the first bandwidth part according to the second bandwidth part and the third bandwidth part.

Specifically, the network device may send the second configuration information to the terminal device, so that the terminal device determines the second bandwidth part according to the second configuration information. In this case, the network device may send third configuration information to the terminal device, wherein the third configuration information includes information about the frequency band occupied by the at least one signal to be measured by the terminal device in the RRM measurement process, so that the terminal device determines the third bandwidth part including the frequency band occupied by the at least one signal according to the third configuration information. The at least one signal may include, for example, an SS Block and/or CSI-RS of at least one cell to be measured by the terminal device. The terminal device ultimately determines the first bandwidth part according to the second bandwidth part and the third bandwidth part jointly.

Optionally, the first bandwidth part includes the second bandwidth part and the third bandwidth part, and the second bandwidth part may at least partially overlap with the third bandwidth part, or may not overlap with the third bandwidth part.

Figure 7:
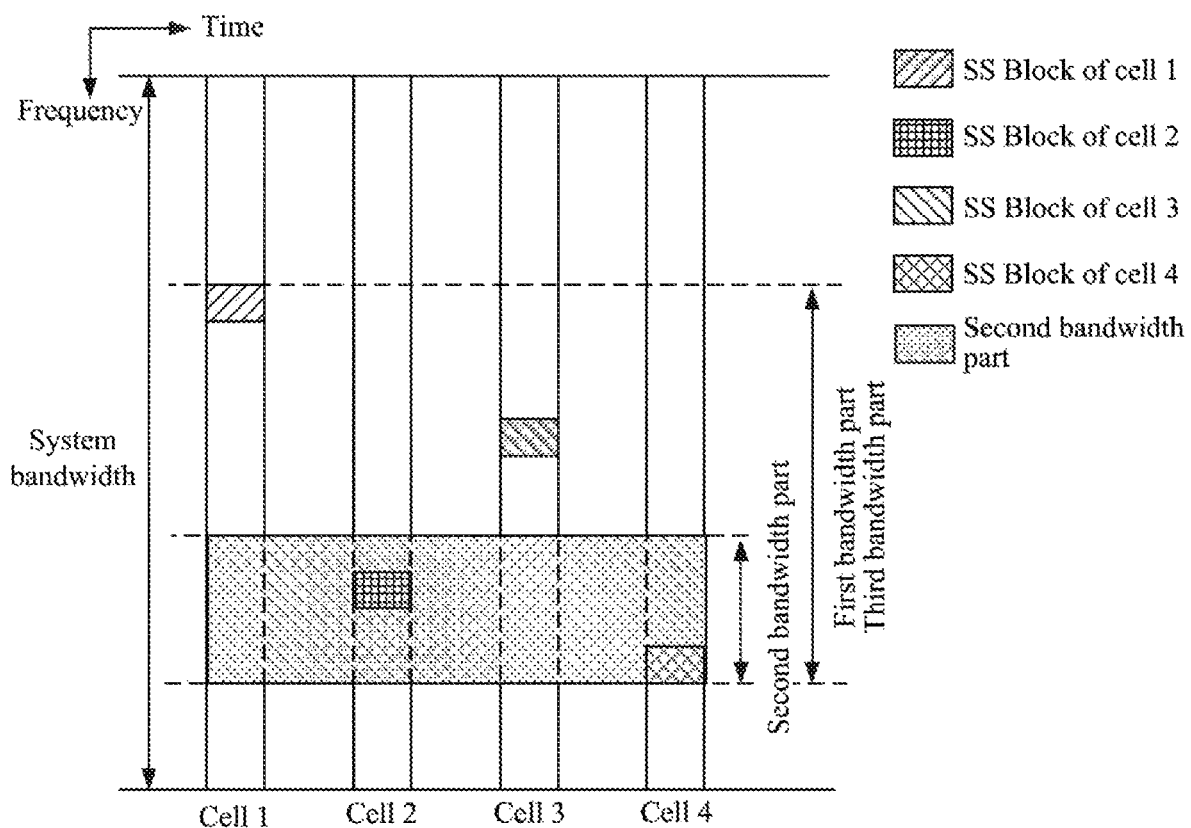
FIG. 7 is a schematic diagram of bandwidth parts according to an implementation of the present disclosure.

For example, if the second bandwidth part is within the third bandwidth part, that is, the third bandwidth part includes the second bandwidth part, then the third bandwidth part may be determined as the first bandwidth part, e.g., the schematic diagram of the bandwidth parts shown in FIG. 7. Taking cell 1, cell 2, cell 3 and cell 4 as an example, SS blocks sent by different cells are located in different frequency bands respectively. The third bandwidth part is a continuous frequency domain resource and includes frequency bands occupied by the SS blocks sent by the four cells, and the second bandwidth part configured by the network device for data transmission of the terminal device is located within a range of the third bandwidth part, then the terminal device may determine the third bandwidth part as the first bandwidth part.

Figure 8:
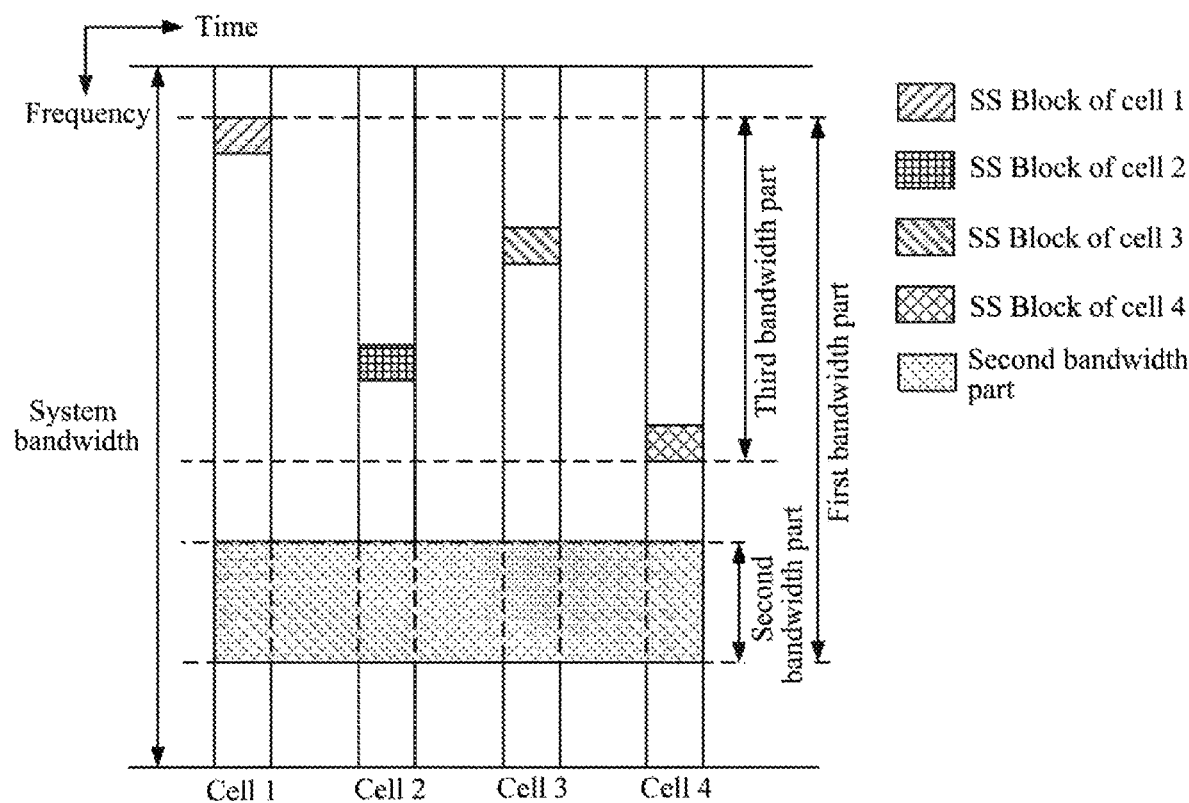
FIG. 8 is a schematic diagram of bandwidth parts according to an implementation of the present disclosure.

For example, if the second bandwidth part does not overlap with the third bandwidth part, then the first bandwidth part should at least include the second bandwidth part and the third bandwidth part, e.g., the schematic diagram of the bandwidth parts shown in FIG. 8. Taking cell 1, cell 2, cell 3 and cell 4 as an example, SS blocks sent by different cells are located in different frequency bands respectively, and the second bandwidth part and the third bandwidth part do not overlap at all, then a range of the first bandwidth part spans the second bandwidth part and the third bandwidth part, that is, the first bandwidth part includes the second bandwidth part and the third bandwidth part, and the first bandwidth part is a continuous domain frequency resource.

Of course, the first bandwidth part may include a discontinuous frequency domain resource, for example, the first bandwidth part may only include the second bandwidth part and the third bandwidth part shown in FIG. 8.

It is assumed in the above that the terminal device can acquire information about the frequency band occupied by at least one signal to be measured, so that the terminal device determines the first bandwidth part according to the third bandwidth part and the second bandwidth part. However, if the terminal device cannot accurately acquire the information about the frequency band occupied by the at least one signal to be measured, then, optionally, the terminal device may take the whole system bandwidth as the first bandwidth part, thus ensuring that the signals of all cells to be measured can be effectively measured.

Optionally, the above bandwidth information may include at least one of: a center frequency, a bandwidth size, and a subcarrier spacing.

For example, the terminal device may determine the center frequency, the bandwidth size, the subcarrier spacing, etc. of the first bandwidth part according to the bandwidth information about the first bandwidth part. The terminal device may determine the center frequency, the bandwidth size, the subcarrier spacing, etc. of the second bandwidth part according to the bandwidth information about the second bandwidth part.

It should be understood that the Bandwidth Part (BWP) in the implementation of the present disclosure may also be referred to as a transmission bandwidth, bandwidth segment, bandwidth configuration, etc., and the system bandwidth may include a plurality of BWPs. Different bandwidth parts may have different bandwidth sizes and/or center frequencies, and numerologies for data transmission, such as subcarrier spacing, in different bandwidth parts may also be different.

Figure 9:
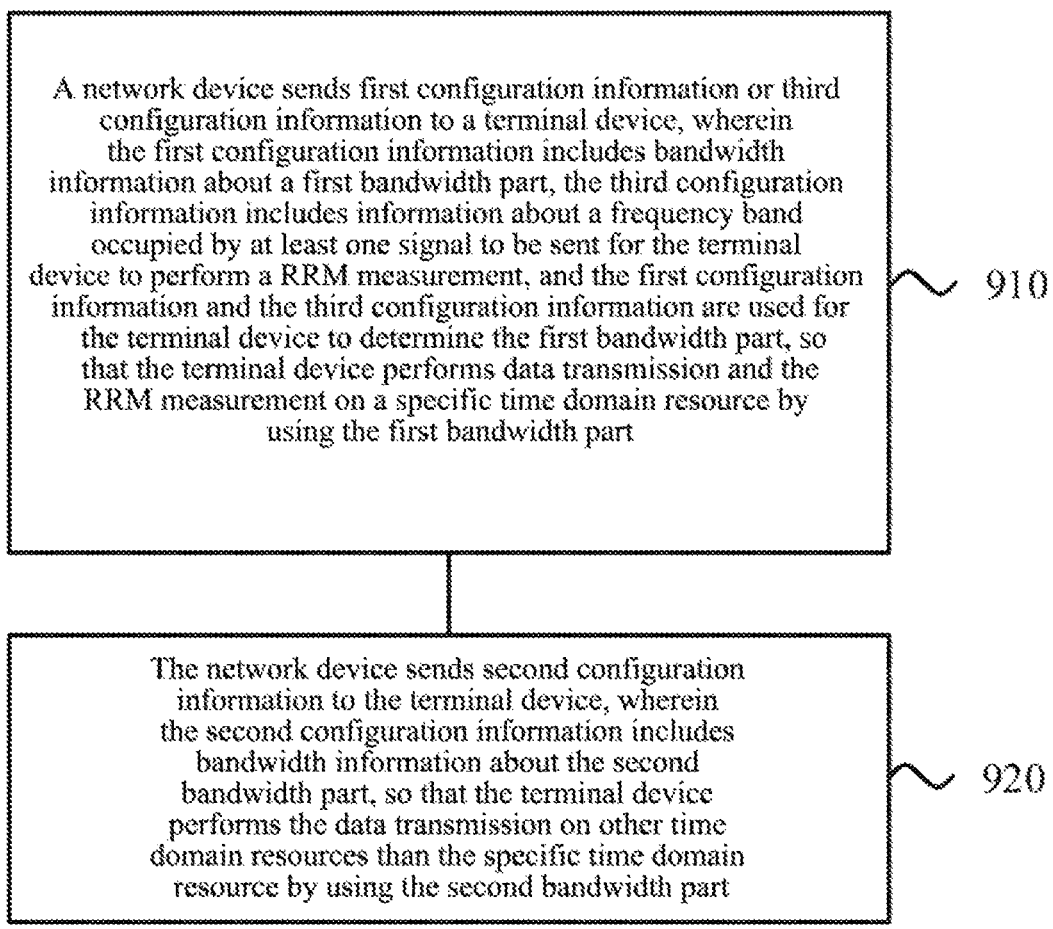
FIG. 9 is a schematic flowchart of a data transmission method according to an implementation of the present disclosure.

FIG. 9 is a schematic flowchart of a data transmission method according to an implementation of the present disclosure. The method shown in the FIG. 9 may be performed by a network device which may be, for example, the network device 10 shown in the FIG. 1. As shown in FIG. 9, the data transmission method includes the following acts 910 and 920.

In 910, a network device sends first configuration information or third configuration information to a terminal device, wherein the first configuration information includes bandwidth information about a first bandwidth part, the third configuration information includes information about a frequency band occupied by at least one signal to be sent for the terminal device to perform a radio resource management (RRM) measurement, and the first configuration information and the third configuration information are used for the terminal device to determine the first bandwidth part, so that the terminal device performs data transmission and the RRM measurement on a specific time domain resource by using the first bandwidth part.

In 920, the network device sends second configuration information to the terminal device, wherein the second configuration information includes bandwidth information about the second bandwidth part, so that the terminal device performs the data transmission on other time domain resources than the specific time domain resource by using the second bandwidth part.

That is, the network device may configure different second bandwidth parts for different terminal devices according to deployment requirements, and indicate the second bandwidth parts to the terminal devices through the second configuration information. In this case, the network device may further determine a third bandwidth part according to a frequency band occupied by at least one signal sent by a plurality of cells for the terminal device to perform the RRM measurement, and finally the network device determines the first bandwidth part according to the second bandwidth part and the third bandwidth part jointly, and indicates the first bandwidth part to the terminal device through the first configuration information. Optionally, the network device may not send the first configuration information, but indicate the information about the frequency band occupied by the at least one signal to the terminal device through the third configuration information, so that the terminal device itself determines the first bandwidth part according to the third configuration information and the second configuration information.

Therefore, the network device configures two different bandwidth parts for the terminal device based on different requirements for the terminal device to perform the data transmission and the RRM measurement, so that the terminal device uses different bandwidth parts when performing different operations. Since the bandwidth part used for the data transmission and RRM measurement is different from the bandwidth part used for data transmission only, the terminal device can effectively perform data transmission in the corresponding bandwidth part and simultaneously meet the requirement of the RRM measurement.

Optionally, if the network device sends the third configuration information to the terminal device, the method further includes: the network device determines a third bandwidth part according to the information about the frequency band occupied by the at least one signal to be sent for the terminal device to perform the RRM measurement, wherein the third bandwidth part includes the frequency band occupied by the at least one signal; and the network device determines the first bandwidth part according to the second bandwidth part and the third bandwidth part.

Optionally, the first bandwidth part includes the second bandwidth part and the third bandwidth part, and the second bandwidth part at least partially overlaps with the third bandwidth part, or does not overlap with the third bandwidth part.

Optionally, the first bandwidth part includes a whole system bandwidth.

Optionally, the bandwidth information includes at least one of: a center frequency, a bandwidth size, and a subcarrier spacing.

Optionally, the specific time domain resource includes a plurality of time domain resources distributed according to a time periodicity.

Optionally, the time periodicity is a time periodicity for the terminal device to perform the RRM measurement.

Optionally, the at least one signal to be sent for the terminal device to perform the RRM measurement includes a synchronization signal (SS) block and/or a channel state indication reference signal (CSI-RS) of at least one cell to be measured.

It should be understood that a detailed process for the network device to determine the first bandwidth part and the second bandwidth part may refer to the relevant descriptions of the terminal device in FIGS. 3 to 8, and will not be described repeatedly here for the sake of brevity.

It should be understood that in various implementations of the present disclosure, values of sequence numbers in the processes described above do not indicate an order of execution, and the order of execution of various processes should be determined by their functions and internal logics, and should not constitute any limitation on implementation processes of implementations of the present disclosure.

Figure 10:
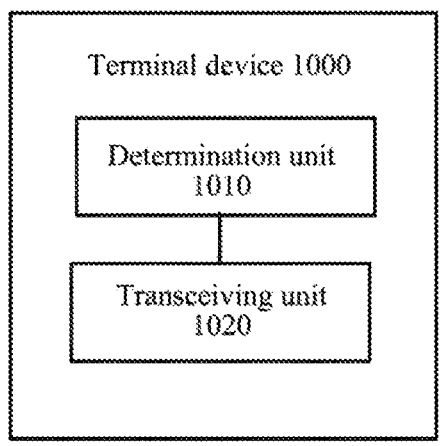
FIG. 10 is a schematic block diagram of a terminal device according to an implementation of the present disclosure.

FIG. 10 is a schematic block diagram of a terminal device 1000 according to an implementation of the present disclosure. As shown in FIG. 10, the terminal device 1000 includes a determination unit 1010 and a transceiving unit 1020.

Herein, the determination unit 1010 is used for determining a first bandwidth part and a second bandwidth part.

The transceiving unit 1020 is used for performing data transmission and a radio resource management (RRM) measurement on a specific time domain resource by using the first bandwidth part, and performing the data transmission on other time domain resources than the specific time domain resource by using the second bandwidth part.

Therefore, the terminal device determines two different transmission bandwidths, and uses different bandwidth parts when performing different operations. Since the bandwidth part used for the data transmission and RRM measurement is different from the bandwidth part used for data transmission only, the terminal device can effectively perform data transmission in the corresponding bandwidth part and simultaneously meet the requirement of the RRM measurement.

Optionally, the transceiving unit 1020 is further used for receiving first configuration information and second configuration information sent by a network device, wherein the first configuration information includes bandwidth information about the first bandwidth part, and the second configuration information includes bandwidth information about the second bandwidth part.

The determining unit 1010 is specifically used for determining the first bandwidth part according to the first configuration information, and determining the second bandwidth part according to the second configuration information.

Optionally, the transceiving unit 1020 is further used for receiving second configuration information and third configuration information sent by a network device, wherein the second configuration information includes bandwidth information about the second bandwidth part, and the third configuration information includes information about a frequency band occupied by at least one signal to be measured by the terminal device in the RRM measurement.

The determining unit 1010 is specifically used for determining the second bandwidth part according to the second configuration information, and determining a third bandwidth part according to the third configuration information, wherein the third bandwidth part includes the frequency band occupied by the at least one signal; and determining the first bandwidth part according to the second bandwidth part and the third bandwidth part.

Optionally, the first bandwidth part includes the second bandwidth part and the third bandwidth part, and the second bandwidth part at least partially overlaps with the third bandwidth part, or does not overlap with the third bandwidth part.

Optionally, the first bandwidth part includes a whole system bandwidth.

Optionally, the bandwidth information includes at least one of: a center frequency, a bandwidth size, and a subcarrier spacing.

Optionally, the specific time domain resource includes a plurality of time domain resources distributed according to a time periodicity.

Optionally, the time periodicity is a time periodicity for the terminal device to perform the RRM measurement.

Optionally, the at least one signal to be measured by the terminal device in the RRM measurement includes a synchronization signal (SS) block and/or a channel state indication reference signal (CSI-RS) of at least one cell to be measured.

Figure 11:
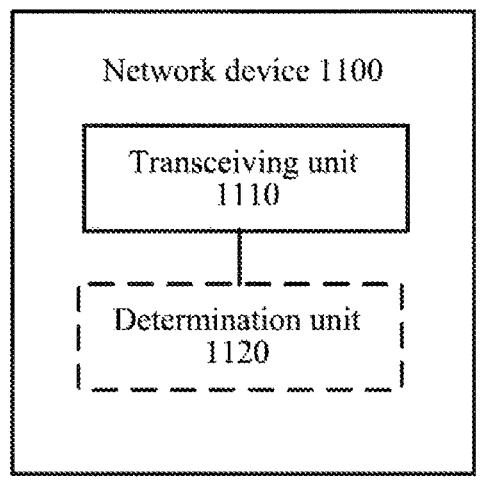
FIG. 11 is a schematic block diagram of a network device according to an implementation of the present disclosure.

FIG. 11 is a schematic block diagram of a network device 1100 according to an implementation of the present disclosure. As shown in FIG. 11, the network device 1100 includes a transceiving unit 1110, used for: sending first configuration information or third configuration information to a terminal device, wherein the first configuration information includes bandwidth information about a first bandwidth part, the third configuration information includes information about a frequency band occupied by at least one signal to be sent for the terminal device to perform a radio resource management (RRM) measurement, and the first configuration information and the third configuration information are used for the terminal device to determine the first bandwidth part, so that the terminal device performs data transmission and the RRM measurement on a specific time domain resource by using the first bandwidth part; and sending second configuration information to the terminal device, wherein the second configuration information includes bandwidth information about the second bandwidth part, so that the terminal device performs the data transmission on other time domain resources than the specific time domain resource by using the second bandwidth part.

Therefore, the network device configures two different bandwidth parts for the terminal device based on different requirements for the terminal device to perform the data transmission and the RRM measurement, so that the terminal device uses different bandwidth parts when performing different operations. Since the bandwidth part used for the data transmission and RRM measurement is different from the bandwidth part used for data transmission only, the terminal device can effectively perform data transmission in the corresponding bandwidth part and simultaneously meet the requirement of the RRM measurement.

Optionally, the network device further includes a determination unit 1120, used for determining a third bandwidth part according to the information about the frequency band occupied by the at least one signal to be sent for the terminal device to perform the RRM measurement, wherein the third bandwidth part includes the frequency band occupied by the at least one signal; and determining the first bandwidth part according to the second bandwidth part and the third bandwidth part.

Optionally, the first bandwidth part includes the second bandwidth part and the third bandwidth part, and the second bandwidth part at least partially overlaps with the third bandwidth part, or does not overlap with the third bandwidth part.

Optionally, the first bandwidth part includes a whole system bandwidth.

Optionally, the bandwidth information includes at least one of: a center frequency, a bandwidth size, and a subcarrier spacing.

Optionally, the specific time domain resource includes a plurality of time domain resources distributed according to a time periodicity.

Optionally, the time periodicity is a time periodicity for the terminal device to perform the RRM measurement.

Optionally, the at least one signal to be sent for the terminal device to perform the RRM measurement includes a synchronization signal (SS) block and/or a channel state indication reference signal (CSI-RS) of at least one cell to be measured.

Figure 12:
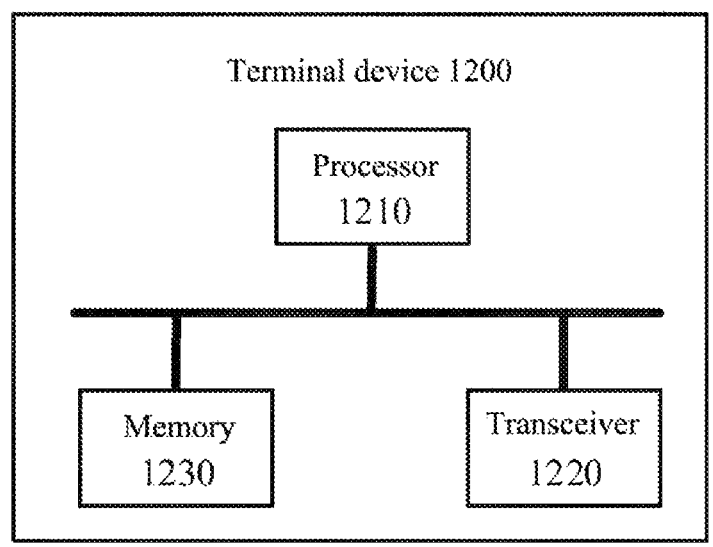
FIG. 12 is a schematic structural diagram of a terminal device according to an implementation of the present disclosure.

FIG. 12 is a schematic structural diagram of a terminal device 1200 according to an implementation of the present disclosure. As shown in FIG. 12, the terminal device includes a processor 1210, a transceiver 1220, and a memory 1230, wherein the processor 1210, the transceiver 1220, and the memory 1230 communicate with each other through an internal connection path. The memory 1230 is used for storing instructions, and the processor 1210 is used for executing instructions stored in the memory 1230 to control the transceiver 1220 to send or receive signals.

Herein, the processor 1210 is used for determining a first bandwidth part and a second bandwidth part.

The transceiver 1220 is used for performing data transmission and a radio resource management (RRM) measurement on a specific time domain resource by using the first bandwidth part, and performing the data transmission on other time domain resources than the specific time domain resource by using the second bandwidth part.

Therefore, the terminal device determines two different transmission bandwidths, and uses different bandwidth parts when performing different operations. Since the bandwidth part used for the data transmission and RRM measurement is different from the bandwidth part used for data transmission only, the terminal device can effectively perform data transmission in the corresponding bandwidth part and simultaneously meet the requirement of the RRM measurement.

Optionally, the transceiver 1220 is further used for receiving first configuration information and second configuration information sent by a network device, wherein the first configuration information includes bandwidth information about the first bandwidth part, and the second configuration information includes bandwidth information about the second bandwidth part.

The processor 1210 is specifically used for determining the first bandwidth part according to the first configuration information, and determining the second bandwidth part according to the second configuration information.

Optionally, the transceiver 1220 is further used for receiving second configuration information and third configuration information sent by a network device, wherein the second configuration information includes bandwidth information about the second bandwidth part, and the third configuration information includes information about a frequency band occupied by at least one signal to be measured by the terminal device in the RRM measurement.

The processor 1210 is specifically used for determining the second bandwidth part according to the second configuration information, and determining a third bandwidth part according to the third configuration information, wherein the third bandwidth part includes the frequency band occupied by the at least one signal; and determining the first bandwidth part according to the second bandwidth part and the third bandwidth part.

Optionally, the first bandwidth part includes the second bandwidth part and the third bandwidth part, and the second bandwidth part at least partially overlaps with the third bandwidth part, or does not overlap with the third bandwidth part.

Optionally, the first bandwidth part includes a whole system bandwidth.

Optionally, the bandwidth information includes at least one of: a center frequency, a bandwidth size, and a subcarrier spacing.

Optionally, the specific time domain resource includes a plurality of time domain resources distributed according to a time periodicity.

Optionally, the time periodicity is a time periodicity for the terminal device to perform the RRM measurement.

Optionally, the at least one signal to be measured by the terminal device in the RRM measurement includes a synchronization signal (SS) block and/or a channel state indication reference signal (CSI-RS) of at least one cell to be measured.

It should be understood that, in an implementation of the present disclosure, the processor 1210 may be a central processing unit (CPU), or the processor 1210 may be other general purpose processor, a digital signal processor (DSP), an application specific integrated circuit (ASIC), a field programmable gate array (FPGA) or other programmable logic device, a discrete gate or a transistor logic device, or a discrete hardware component, etc. The general purpose processor may be a microprocessor, or the processor may be any conventional processor or the like.

The memory 1230 may include a read only memory and a random access memory, and provide instructions and data to the processor 1210. A portion of the memory 1230 may include a non-volatile random access memory.

In an implementation process, the acts of the methods described above may be accomplished by integrated logic circuits of hardware in the processor 1210 or instructions in a form of software. The acts of the data transmission method disclosed in the implementation of the present disclosure may be directly accomplished by an execution of a hardware processor or accomplished by a combination of hardware and software modules in the processor 1210. The software modules may be located in a storage medium commonly used in the art, such as a random access memory, flash memory, read-only memory, programmable read-only memory or electrically erasable programmable memory, or register. The storage medium is located in the memory 1230, and the processor 1210 reads the information in the memory 1230 and accomplishes the acts of the above method in combination with its hardware. In order to avoid repetition, it will not be described in detail here.

The terminal device 1200 according to the implementation of the present disclosure may correspond to the terminal device for executing the method 300 in the method 300 and the terminal device 1000 according to the implementation of the present disclosure, and various units or modules in the terminal device 1200 are respectively used for executing various actions or processing processes executed by the terminal device in the method 300. Here, in order to avoid redundancy, detailed description thereof is omitted.

Figure 13:
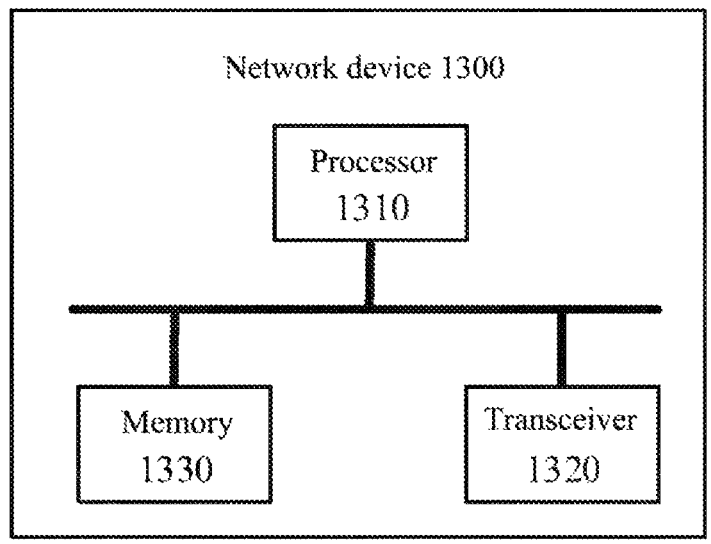
FIG. 13 is a schematic structural diagram of a network device according to an implementation of the present disclosure.

FIG. 13 is a schematic structural diagram of a network device 1300 according to an implementation of the present disclosure. As shown in FIG. 13, the network device includes a processor 1310, a transceiver 1320, and a memory 1330, wherein the processor 1310, the transceiver 1320, and the memory 1330 communicate with each other through an internal connection path. The memory 1330 is used for storing instructions, and the processor 1310 is used for executing instructions stored in the memory 1330 to control the transceiver 1320 to send or receive signals.

The transceiver 1320 is used for sending first configuration information or third configuration information to a terminal device, wherein the first configuration information includes bandwidth information about a first bandwidth part, the third configuration information includes information about a frequency band occupied by at least one signal to be sent for the terminal device to perform a radio resource management (RRM) measurement, and the first configuration information and the third configuration information are used for the terminal device to determine the first bandwidth part, so that the terminal device performs data transmission and the RRM measurement on a specific time domain resource by using the first bandwidth part; and sending second configuration information to the terminal device, wherein the second configuration information includes bandwidth information about the second bandwidth part, so that the terminal device performs the data transmission on other time domain resources than the specific time domain resource by using the second bandwidth part.

Therefore, the network device configures two different bandwidth parts for the terminal device based on different requirements for the terminal device to perform the data transmission and the RRM measurement, so that the terminal device uses different bandwidth parts when performing different operations. Since the bandwidth part used for the data transmission and RRM measurement is different from the bandwidth part used for data transmission only, the terminal device can effectively perform data transmission in the corresponding bandwidth part and simultaneously meet the requirement of the RRM measurement.

Optionally, the processor 1310 is used for determining a third bandwidth part according to the information about the frequency band occupied by the at least one signal to be sent for the terminal device to perform the RRM measurement, wherein the third bandwidth part includes the frequency band occupied by the at least one signal; and determining the first bandwidth part according to the second bandwidth part and the third bandwidth part.

Optionally, the first bandwidth part includes the second bandwidth part and the third bandwidth part, and the second bandwidth part at least partially overlaps with the third bandwidth part, or does not overlap with the third bandwidth part.

Optionally, the first bandwidth part includes a whole system bandwidth.

Optionally, the bandwidth information includes at least one of: a center frequency, a bandwidth size, and a subcarrier spacing.

Optionally, the specific time domain resource includes a plurality of time domain resources distributed according to a time periodicity.

Optionally, the time periodicity is a time periodicity for the terminal device to perform the RRM measurement.

Optionally, the at least one signal to be sent for the terminal device to perform the RRM measurement includes a synchronization signal (SS) block and/or a channel state indication reference signal (CSI-RS) of at least one cell to be measured.

It should be understood that in the implementation of the present disclosure, the processor 1310 may be a central processing unit (CPU), or the processor 1310 may be other general purpose processor, a digital signal processors (DSP), an application specific integrated circuit (ASIC), a field programmable gate arrays (FPGA) or other programmable logic device, discrete gate or transistor logic device, a discrete hardware component, etc. The general purpose processor may be a microprocessor or the processor may be any conventional processor or the like.

The memory 1330 may include a read only memory and a random access memory, and provide instructions and data to the processor 1310. A portion of memory 1330 may include a non-volatile random access memory. In an implementation process, the acts of the methods described above may be accomplished by integrated logic circuits of hardware in the processor 1310 or instructions in a form of software. The acts of the data transmission method disclosed in the implementation of the present disclosure may be directly accomplished by an execution of a hardware processor or accomplished by a combination of hardware and software modules in the processor 1310. The software modules may be located in a storage medium commonly used in the art, such as a random access memory, flash memory, read-only memory, programmable read-only memory or electrically erasable programmable memory, or register. The storage medium is located in the memory 1330, and the processor 1310 reads the information in the memory 1330 and accomplishes the acts of the above method in combination with its hardware. In order to avoid repetition, it will not be described in detail here.

The network device 1300 according to the implementation of the present disclosure may correspond to the network device for executing the method 900 in the method 900 and the network device 1100 according to the implementation of the present disclosure, and various units or modules in the network device 1300 are respectively used for executing various actions or processing processes executed by the network device in the method 900. Here, in order to avoid redundancy, detailed description thereof is omitted.

Figure 14:
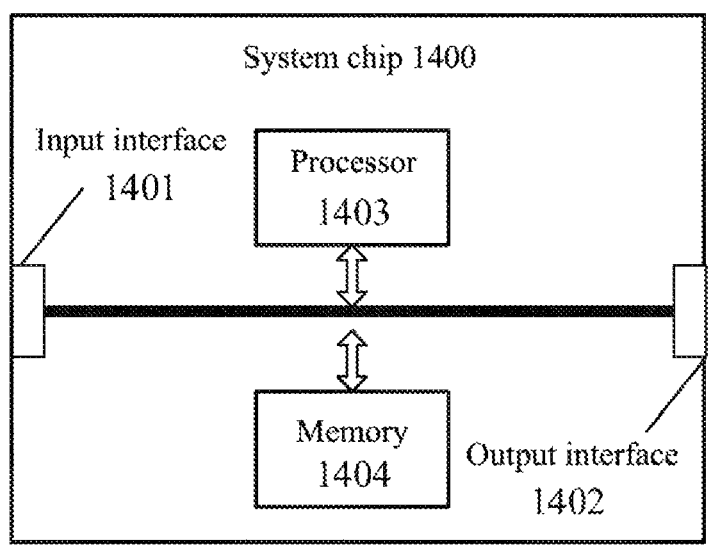
FIG. 14 is a schematic structural diagram of a system chip according to an implementation of the present disclosure.

FIG. 14 is a schematic structural diagram of a system chip according to an implementation of the present disclosure. The system chip 1400 of FIG. 14 includes an input interface 1401, an output interface 1402, at least one processor 1403, and a memory 1404. The input interface 1401, the output interface 1402, the processor 1403, and the memory 1404 are connected to each other through an internal connection path. The processor 1403 is used for executing codes in the memory 1404.

Optionally, the processor 1403 may implement the method 400 executed by the terminal device in the method implementation when the codes are executed. For the sake of brevity, it will not be repeated here.

Optionally, the processor 1403 may implement the method 900 executed by the network device in the method implementation when the codes are executed. For the sake of brevity, it will not be repeated here.

Those of ordinary skill in the art will recognize that the example units and algorithm acts described in connection with the implementations disclosed herein may be implemented in electronic hardware, or a combination of computer software and electronic hardware. Whether these functions are implemented in hardware or software depends on a specific application and design constraint of the technical solution. Skilled in the art may use different manners to realize the described functions for each particular application, but such realization should not be considered to be beyond the scope of the present disclosure.

Those skilled in the art may clearly understand that for convenience and conciseness of description, the specific working process of the system, device and unit described above may refer to the corresponding process in the aforementioned implementations of methods, and details are not described herein again.

In several implementations provided by the present disclosure, it should be understood that the disclosed systems, apparatuses and methods may be implemented in other ways. For example, the apparatus implementation described above is only illustrative, for example, the division of the unit is only a logical function division, and there may be other ways of division in actual implementation, for example, multiple units or components may be combined or integrated into another system, or some features may be ignored or not executed. On the other hand, the mutual coupling or direct coupling or communication connection shown or discussed may be indirect coupling or communication connection through some interfaces, devices or units, and may be in electrical, mechanical or other forms.

The unit described as a separate component may or may not be physically separated, and the component shown as a unit may or may not be a physical unit, i.e., may be located in one place or may be distributed over multiple network units. Some or all of the units may be selected according to practical needs to achieve a purpose of the solution of the implementations.

In addition, various functional units in various implementations of the present disclosure may be integrated in one monitoring unit, or various units may be physically present separately, or two or more units may be integrated in one unit.

The functions may be stored in a computer readable storage medium if implemented in a form of software functional units and sold or used as a separate product. Based on this understanding, the technical solution of the present disclosure, in essence, or the part contributing to the existing art, or the part of the technical solution, may be embodied in the form of a software product stored in a storage medium, including several instructions for causing a computer device (which may be a personal computer, a server, or a network device, etc.) to perform all or part of the acts of the methods described in various implementations of the present disclosure. The aforementioned storage medium includes various media capable of storing program codes, such as a U disk, a mobile hard disk, a read-only memory (ROM), a random access memory (RAM), a magnetic disk, or an optical disk.

What are described above are merely example implementations of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the protection scope of the implementations of the present disclosure should be based on the protection scope of the claims.

The invention claimed is:

1. A method for data transmission, comprising:
performing, by a terminal device, data transmission and a radio resource management (RRM) measurement on a specific time domain resource by using a first bandwidth part, and performing the data transmission on other time domain resources than the specific time domain resource by using a second bandwidth part.

2. The method according to claim 1, wherein the method further comprises:
receiving, by the terminal device, first configuration information and second configuration information sent by a network device, wherein the first configuration information comprises bandwidth information about the first bandwidth part, and the second configuration information comprises bandwidth information about the second bandwidth part;
wherein the first bandwidth part is determined according to the first configuration information, and the second bandwidth part is determined according to the second configuration information.

3. The method according to claim 2, wherein the bandwidth information comprises at least one of: a center frequency, a bandwidth size, or a subcarrier spacing.

4. The method according to claim 1, wherein the specific time domain resource comprises a plurality of time domain resources distributed according to a time periodicity.

5. The method according to claim 1, wherein at least one signal to be measured by the terminal device in the RRM measurement comprises at least one of a synchronization signal (SS) block or a channel state indication reference signal (CSI-RS) of at least one cell to be measured.

6. The method according to claim 1, wherein the first bandwidth part comprises a discontinuous frequency domain resource.

7. A method for data transmission, comprising:
sending, by a network device, first configuration information to a terminal device, wherein the first configuration information comprises bandwidth information about a first bandwidth part, and the first configuration information is used for the terminal device to determine the first bandwidth part to enable the terminal device to perform data transmission and a radio resource management (RRM) measurement on a specific time domain resource by using the first bandwidth part; and
sending, by the network device, second configuration information to the terminal device, wherein the second configuration information comprises bandwidth information about a second bandwidth part, to enable the terminal device to perform the data transmission on other time domain resources than the specific time domain resource by using the second bandwidth part.

8. The method according to claim 7, wherein the bandwidth information comprises at least one of: a center frequency, a bandwidth size, or a subcarrier spacing.

9. The method according to claim 7, wherein the specific time domain resource comprises a plurality of time domain resources distributed according to a time periodicity.

10. The method according to claim 7, wherein at least one signal to be sent for the terminal device to perform the RRM measurement comprises at least one of a synchronization signal (SS) block or a channel state indication reference signal (CSI-RS) of at least one cell to be measured.

11. The method according to claim 7, wherein the first bandwidth part comprises a discontinuous frequency domain resource.

12. A terminal device, comprising a processor, a transceiver, and a memory, wherein the processor, the transceiver, and the memory communicate with each other through an internal connection path, the memory is used for storing instructions, and the processor is used for, when executing the instructions stored in the memory:
performing data transmission through the transceiver and a radio resource management (RRM) measurement on a specific time domain resource by using a first bandwidth part, and performing the data transmission through the transceiver on other time domain resources than the specific time domain resource by using a second bandwidth part.

13. The terminal device according to claim 12, wherein the processor is further used for:
receiving, through the transceiver, first configuration information and second configuration information sent by a network device, wherein the first configuration information comprises bandwidth information about the first bandwidth part, and the second configuration information comprises bandwidth information about the second bandwidth part;
wherein the first bandwidth part is determined according to the first configuration information, and the second bandwidth part is determined according to the second configuration information.

14. The terminal device according to claim 13, wherein the bandwidth information comprises at least one of: a center frequency, a bandwidth size, or a subcarrier spacing.

15. The terminal device according to claim 12, wherein the specific time domain resource comprises a plurality of time domain resources distributed according to a time periodicity.

16. The terminal device according to claim 12, wherein at least one signal to be measured by the terminal device in the RRM measurement comprises at least one of a synchronization signal (SS) block or a channel state indication reference signal (CSI-RS) of at least one cell to be measured.

17. A network device, comprising a processor, a transceiver, and a memory, wherein the processor, the transceiver, and the memory communicate with each other through an internal connection path, the memory is used for storing instructions, and the processor is used for, when executing the instructions stored in the memory:

sending first configuration information to a terminal device through the transceiver, wherein the first configuration information comprises bandwidth information about a first bandwidth part, and the first configuration information is used for the terminal device to determine the first bandwidth part to enable the terminal device to perform data transmission and a radio resource management (RRM) measurement on a specific time domain resource by using the first bandwidth part;

wherein the processor is further used for sending second configuration information to the terminal device through the transceiver, wherein the second configuration information comprises bandwidth information about a second bandwidth part, to enable the terminal device to perform the data transmission on other time domain resources than the specific time domain resource by using the second bandwidth part.

18. The network device according to claim 17, wherein the bandwidth information comprises at least one of: a center frequency, a bandwidth size, or a subcarrier spacing.

19. The network device according to claim 17, wherein the specific time domain resource comprises a plurality of time domain resources distributed according to a time periodicity.

20. The network device according to claim 17, wherein at least one signal to be sent for the terminal device to perform the RRM measurement comprises at least one of a synchronization signal (SS) block or a channel state indication reference signal (CSI-RS) of at least one cell to be measured.

* * * * *